United States Patent
Schnitzler et al.

(10) Patent No.: US 10,598,913 B2
(45) Date of Patent: Mar. 24, 2020

(54) TRANSMITTED LIGHT ILLUMINATION APPARATUS FOR A MICROSCOPE

(71) Applicant: LEICA INSTRUMENTS (SINGAPORE) PTE. LTD., Singapore (SG)

(72) Inventors: Harald Schnitzler, Lüchingen (CH); Robert Paulus, Hergatz (DE)

(73) Assignee: Leica Instruments (Singapore) Pte. Ltd., Singapore (SG)

(*) Notice: Subject to any disclaimer, the term of this patent is extended or adjusted under 35 U.S.C. 154(b) by 121 days.

(21) Appl. No.: 15/890,381

(22) Filed: Feb. 7, 2018

(65) Prior Publication Data
US 2018/0231758 A1    Aug. 16, 2018

(30) Foreign Application Priority Data
Feb. 16, 2017 (EP) ..................................... 17156539

(51) Int. Cl.
| G02B 21/12 | (2006.01) |
| G02B 19/00 | (2006.01) |
| G02B 26/02 | (2006.01) |
| G02B 21/36 | (2006.01) |

(52) U.S. Cl.
CPC ....... *G02B 21/125* (2013.01); *G02B 19/0023* (2013.01); *G02B 19/0047* (2013.01); *G02B 26/023* (2013.01); *G02B 21/36* (2013.01)

(58) Field of Classification Search
None
See application file for complete search history.

(56) References Cited

U.S. PATENT DOCUMENTS

| 7,324,272 B1* | 1/2008 | Deck ......................... G01J 3/02 359/379 |
| 7,554,727 B2 | 6/2009 | Shimizu et al. |
| 2002/0191281 A1* | 12/2002 | Osa ......................... G02B 21/06 359/385 |
| 2012/0200905 A1 | 8/2012 | Paulus et al. |
| 2014/0354796 A1* | 12/2014 | Hein ...................... G02B 21/086 348/79 |
| 2015/0062447 A1* | 3/2015 | Hein ...................... G02B 21/086 349/1 |
| 2015/0293339 A1* | 10/2015 | Schuman ............. G02B 21/088 359/385 |
| 2016/0048011 A1 | 2/2016 | Suzuki et al. |

FOREIGN PATENT DOCUMENTS

| JP | 2011081082 A | 4/2011 |
| JP | 2013054174 A | 3/2013 |

* cited by examiner

*Primary Examiner* — Derek S. Chapel
(74) *Attorney, Agent, or Firm* — Hodgson Russ LLP (57) ABSTRACT

The invention relates to a transmitted light illumination apparatus (2) for a microscope (1), said transmitted light illumination apparatus (2) comprising, a planar light source (20), a mirror (23) having a concave mirror surface (24) arranged in the direction of light emitted from the planar light source (20), and at least one diaphragm element (22) being at least partially opaque and being arranged between the planar light source (20) and the concave mirror surface (24) such that by moving the at least one diaphragm element (22) in at least one direction parallel to a plane defined by the planar light source (20), the planar light source (20) is at least partially covered by the at least one diaphragm element (22).

16 Claims, 5 Drawing Sheets

TRANSMITTED LIGHT ILLUMINATION APPARATUS FOR A MICROSCOPE

CROSS REFERENCE TO RELATED APPLICATIONS

This application claims priority of European patent application number 17156539.3 filed Feb. 16, 2017, the entire disclosure of which is incorporated by reference herein.

FIELD OF THE INVENTION

The present invention relates to a transmitted light illumination apparatus for microscopes, especially stereomicroscopes or macroscopes.

BACKGROUND OF THE INVENTION

In transmitted light microscopy it is of high importance to adapt the illumination of a sample to be imaged by the microscope to the specific observation situation, especially in the case of samples of low contrast. Known compound microscopes often feature exchangeable objective lenses to allow an adjustment of the magnification. Such compound microscopes also enable advanced illumination set-ups, such as phase contrast. The so-called Koehler illumination allows in compound microscopes an adaption of the illumination to the observation since the locations of the pupils of the objective lenses hardly differ from each other. Koehler illumination is characterized in an imaging of the illuminated field diaphragm into the object plane and an imaging of the aperture diaphragm into the exit pupil of the objective. In microscopes having a zoom system, however, the axial position of the conjugated plane of the objective pupil migrates along the optical axis depending on the zoom magnification. In order to properly adapt the illumination to a variation of magnification of the zoom system, an illumination zoom dynamically tracking the optical configuration of the zoom system of the microscope would be required. Such an illumination apparatus, however, is cumbersome and complicated in its use.

Typical requirements in transmitted light illumination devices (also called "transmitted-light bases") for zoom microscopes, in particular stereo microscopes, are:
a) high contrast in the bright field illumination mode;
b) relief contrast by oblique light incidence, possible through the entire field of view and the entire zoom range;
c) operability with different kinds of zoom systems, objective lenses and other accessory parts; and
d) ergonomic design of low height.

U.S. Pat. No. 7,554,727 B2 describes a transmitted light illumination apparatus for a microscope having an optically transparent sample mount plate on which a sample is mounted, a planar light source that projects substantially uniform illumination light toward the sample mount plate, and a light orientation member that restricts diffusion of the illumination light in relation to at least one direction. In an embodiment, the light orientation member is a louver film comprising micro louvers parallel to the East-West direction which direction is parallel to the plane that contains the two optical axes of a binocular stereoscopic microscope. By reducing the illumination angle in relation to a direction vertical to this plane, the contrast of bright field illumination is improved. Further inclination of the micro louvers results in a higher contrast and asymmetrical illumination of the sample up to oblique illumination to achieve a relief effect. Since the light orientation member is arranged close to the sample, a brightness reduction in the object field cannot be avoided. This results in a mismatch of the observation pupil and the illumination pupil.

DE 10 2011 003 603 A1 discloses a transmitted light illumination apparatus having an integrated planar light source, for microscopes, particularly for zoom microscopes and stereo microscopes, having a diaphragm arrangement including two diaphragm elements moveable relative to one another in a North-South-direction which direction is perpendicular to the plane that contains the two optical axes of the stereoscopic microscope, the two diaphragm elements each comprising a cutout in the form of a semicircle. Moving the diaphragm elements towards each other defines a resulting diaphragm opening of a circular or essentially elliptical shape depending on the position of the diaphragm elements. Depending on the magnification and the illumination mode it is possible to select a specific diaphragm setting. Since, in the brightfield mode, the diaphragm elements do not reduce the illumination angles, an illumination under a relatively broad range of angles of illumination and thus of relatively low contrast is achieved. In the case of oblique illumination, one diaphragm element is displaced more than the other so that the resulting diaphragm opening is then arranged asymmetrically in respect of the East-West-direction. This allows a manipulation of the observation pupil. Such a manipulation, however, only becomes effective if the diaphragm elements are arranged in a conjugated plane of the observation pupil (objective pupil). Since the location of this plane varies depending on the zoom position, the manipulation of the observation pupil is not effective over the entire zoom range.

Further, there are known transmitted-light bases for stereo microscopes or macroscopes which use integrated halogen lamps as a light source. Directional illumination light is generated by means of collector lenses and a combination of diffusor elements and Fresnel lenses. The illumination light is directed onto the object plane via a rotatable/shiftable mirror. Since the sample is illuminated with illumination light of a small range of angles, the brightfield contrast is sufficiently high. Due to the kind of optical components used for such a transmitted-light base, a reduction of its height is limited. By arranging diaphragm elements in the illumination light beam path oblique illumination can be realized. Again, however, the pupil manipulation is only effective within a limited zoom range since outside that zoom range the observation pupil and the illumination pupil do not match.

SUMMARY AND ADVANTAGES OF THE INVENTION

It is an object of the present invention to provide a transmitted light illumination apparatus for a microscope and a microscope including such a transmitted light illumination apparatus, which essentially fulfill the typical requirements to a transmitted light base outlined above, in particular each of said requirements as far as possible.

Against this background, the present invention proposes a transmitted light illumination apparatus having a planar light source, a mirror having a concave mirror surface arranged in the direction of light emitted from the planar light source, and at least one diaphragm element which is at least partially opaque and is arranged between the planar light source and the concave mirror surface such that by moving the at least one diaphragm element in at least one direction parallel to a plane defined by the planar light source, the planar light source is at least partially covered by the at least one diaphragm element. The present invention also proposes a microscope having such a transmitted light illumination apparatus. Advantageous embodiments are the subject matter of the description that follows.

A transmitted light illumination apparatus according to the present invention comprises a planar light source (flat panel light source), a mirror having a concave mirror surface (light reflecting surface) arranged in the direction of light emitted from the planar light source, and at least one diaphragm element (shading or contrasting element) being at least partially opaque and being arranged between the planar light source and the concave mirror surface. The at least one diaphragm element is movable in at least one direction parallel to a plane defined by the planar light source. This plane is preferably a plane parallel to the primary plane of extension of the flat panel light source and close to the light source. By moving the at least one diaphragm element in at least one direction, the planar light source is at least partially covered by the diaphragm element(s).

By using a concave mirror surface, advantageously of a paraboloid shape or the shape of a freeform surface, it is possible to limit the range of angles of illumination under which a sample on the object plane of the microscope is illuminated. This results in a high contrast in the bright field observation mode. By covering parts of the planar light source with the at least one diaphragm element, contrast illumination modes can be realized. Due to the concave, particularly paraboloid mirror surface, a uniform contrasting effect in the direction of contrast can be achieved. The direction of contrast usually and advantageously can be defined as the North-South-direction, which direction is perpendicular to a plane containing the two optical axes of a stereoscopic microscope. With the present invention, no gradient of brightness in the direction of contrast is caused by the contrasting element (diaphragm element). It should be noted that the direction of contrast does not necessarily coincide with the direction of movement of the diaphragm element.

By adapting the shape of the at least one diaphragm element and the shape of the concave mirror surface, as explained later, it is easily possible to realize different contrast illumination modes in different microscope set-ups through the entire field of view and the entire zoom range.

The transmitted light illumination apparatus according to the present invention can easily be built into existing microscopes and can be constructed in a design of low height.

Thus, a transmitted light illumination apparatus according to the present invention allows to fulfil the typical requirements to a transmitted light base outlined above in the introductory part of the specification.

Advantageously, especially in case of a paraboloid mirror surface, the planar light source is arranged in a focus of the concave mirror surface. This allows for a further limitation of the range of illumination angles to a small defined illumination angle range yielding in a high contrast.

Advantageously, either one single diaphragm element or two diaphragm elements are present. In the case of two diaphragm elements, each diaphragm element is movable in relation to the other one along the same direction, particularly the above described North-South-direction. Advantageously, the two diaphragm elements can be moved towards each other and apart from each other. The resulting free space between the two diaphragm elements defines a diaphragm opening. In case of one single diaphragm element, the diaphragm opening corresponds to the space of the planar light source not covered by the diaphragm element.

In case of a stereomicroscope having two observation channels, the direction of contrast should be for both channels the North-South-direction so that only little modification is caused in the East-West-direction resulting in an almost uniform contrasting in the East-West-direction, i.e. in the left and right observation channels. This provides a high quality three-dimensional image.

Advantageously, the at least one diaphragm element is a planar element. This allows an easy handling and fulfills the small space requirements for the at least one diaphragm element. Further, it is advantageous if the at least one especially planar diaphragm element comprises an edge having a contour. Such a contour allows to properly define the preferred direction of contrast, particularly as the North-South-direction, and to achieve a uniform contrasting effect in the East-West-direction. In the case of a stereomicroscope, a (at least partial) curved or V-shaped contour has proven useful. The curved contour is preferably of a parabolic form, while the V-shaped contour is preferably of a V-form having a descending flank and an ascending flank. This allows the left and right channel of the stereoscopic microscope to be contrasted simultaneously in the same way, more exactly, to shade the parts of the planar light surface corresponding to the left and the right channel simultaneously in the same way. The symmetry of the V- or parabolic contour is due to the paraboloid mirror surface. Such a contour would therefore also be suitable for single channel microscopes.

Advantageously, the edge of the at least one planar element has a gradient in its light transmissivity. This embodiment takes different microscopic set-ups into account and allows uniform contrasting in case of different microscope configurations as will be explained later in connection with the figures.

In a second aspect, the invention provides a microscope, in particular a stereomicroscope or a macroscope, having a transmitted light illumination apparatus according to the first aspect of the present invention as described above. A bright field illumination mode can be implemented if in a first position of the at least one diaphragm element the planar light source is not covered by the diaphragm element or at least essentially not covered. In order to implement a contrast illumination mode, the at least one diaphragm element is moved into a second position so as to at least partially cover the planar light source.

Usefully, the object plane of the microscope is arranged in the direction of light reflected from the mirror of the transmitted light illumination apparatus.

When using a diaphragm element with a contoured edge, it is advantageous if the contour is variable in its shape. Further, when using a diaphragm element with an edge having a gradient of light transmissivity, it is advantageous if the length of the gradient is variable. Each of said measures, especially both measures, allows to take different microscopic set-ups, i.e. highly magnifying systems and low magnifying systems, into account. By choosing a suitable gradient length and/or a specific curved/parabolic contour, it is possible to come to a optimal compromise in relation to the relevant microscope systems.

Further advantages and embodiments of the invention are evident from the description and the appended drawings.

It is understood that the features recited above and those yet to be explained below can be used not only in the respective combination indicated, but also in other combinations or in isolation, without leaving the context of the present invention.

BRIEF DESCRIPTION OF THE DRAWING VIEWS

The invention is schematically depicted in the drawings on the basis of exemplifying embodiments, and will be described in detail below with reference to the drawings.

DETAILED DESCRIPTION OF THE INVENTION

Figure 1:
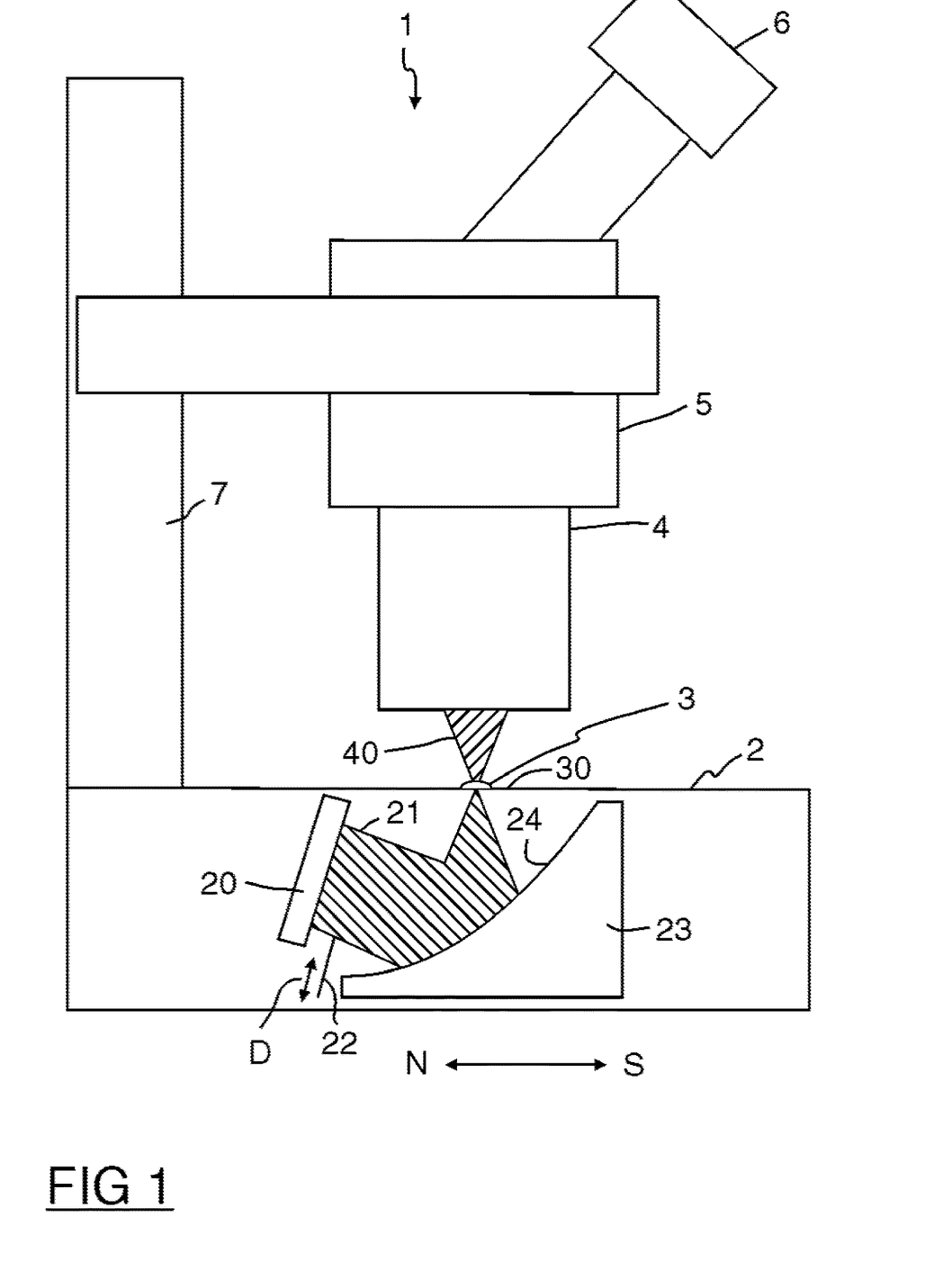
FIG. 1 schematically shows a microscope having a transmitted light illumination apparatus according to an embodiment of the present invention.

FIG. 1 schematically shows a microscope 1 having a transmitted light illumination apparatus 2 (also called transmitted light base) comprising a planar light source 20, a mirror 23 having a concave mirror surface 24, in this embodiment the surface being of a paraboloid form and arranged in the direction of light emitted from the planar light source 20 such that the planar light source 20 is arranged in the focus of the paraboloid surface 24. One single diaphragm element 22 being at least partially or even totally opaque is arranged between the planar light source 20 and the paraboloid mirror surface 24 in closer vicinity to the planar light source 20. The diaphragm element 22 (also called shading element) is movable in the direction D as illustrated by the arrows. The diaphragm element 22 actively limits the illumination aperture 21 and reduces the illumination aperture 21 by being moved into the illumination beam. The diaphragm element 22 being a planar element in this embodiment, can be moved parallel to the main plane defined by the planar light source 20 (see direction of arrows D) resulting in a partial covering of the planar light source 20.

As can be seen from FIG. 1, the microscope 1 further comprises a sample 3 to be illuminated by the transmitted light base 2 and to be observed by the microscope 1. The sample 3 is mounted on the object plane to define an object field plane 30. The sample 3 is located in the focus plane of the objective lens 4 of the microscope 1. The corresponding observation aperture is labelled 40. The microscope 1 further encompasses a zoom system 5 for varying the magnification. Two eyepieces 6 are arranged with corresponding observation channels next to each other in a West-East (W-E) direction extending into the drawing plane. The North-South (N-S) direction extends in the drawing plane as shown in FIG. 1. The observation optic of the microscope 1 is mounted on a microscope stand 7.

Figure 2:
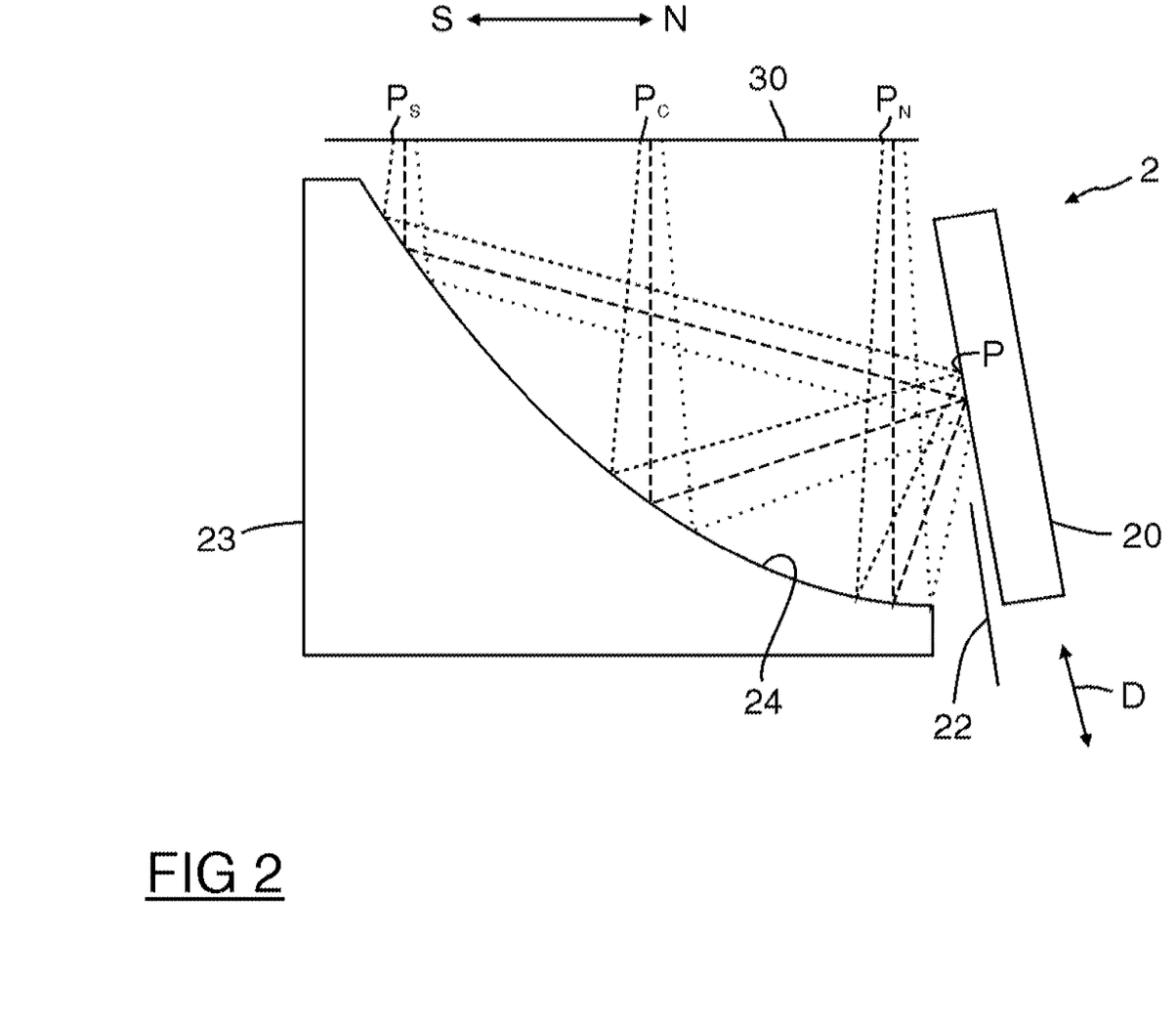
FIG. 2 shows the embodiment of the transmitted light illumination apparatus of FIG. 1 including an illustration of the illumination set-up.

The mode of operation of the transmitted light base 2 is further explained with reference to FIG. 2. FIG. 2 schematically depicts the transmitted light illumination apparatus 2 of FIG. 1 showing the illumination set-up in more detail. The planar light source 20 is arranged in the focus of the paraboloid mirror surface 24 of the mirror 23. By this arrangement, as can be seen from FIG. 2, illumination light of a small range of illumination angles is directed to the object field 30. This results in a high contrast in a bright field illumination mode. FIG. 2 shows the illumination set-up effective with low microscope magnifications. Points $P_S$, $P_C$ and $P_N$ depict illuminated points in the South, in the Center and in the North of the object field 30. Each illumination angel corresponds to a different light emitting point P on the planar light source 20. By moving the diaphragm element 22 in the direction D into the illumination light beam shown in FIG. 2 a part of the illumination light beam is shadowed, resulting in a lower brightness and in a further reduced and asymmetric range of illumination angles throughout the illuminated points $P_S$, $P_C$ and $P_N$. This yields in a uniform contrasting along the N-S direction (contrasting direction) without any gradient in brightness. Furthermore, the contrasting effect in the W-E direction is the same which is essential when using a stereomicroscope with observation channels arranged in the W-E direction.

Figure 3:
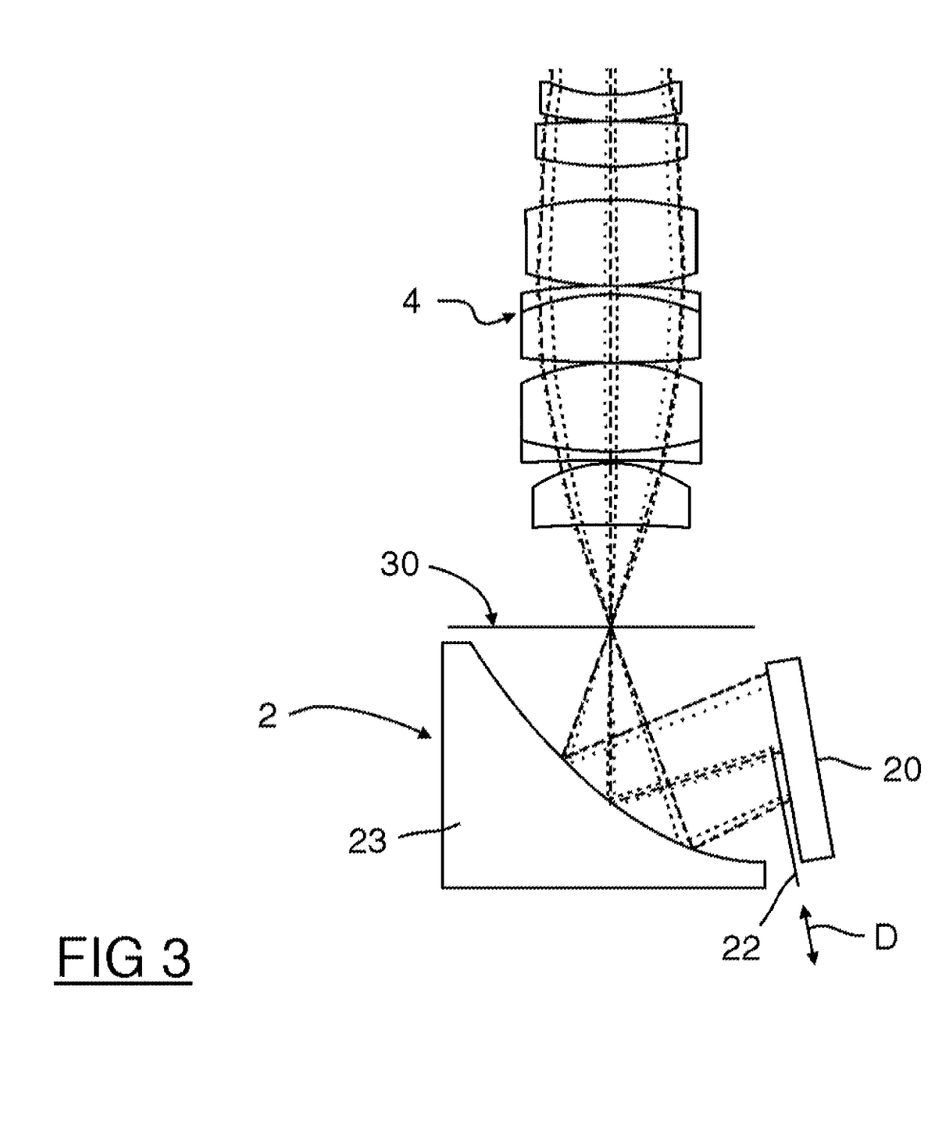
FIG. 3 shows the transmitted light illumination apparatus of FIG. 2 and the objective lens of the microscope of FIG. 1 to illustrate the observation set-up.

FIG. 3 shows the observation set-up at high magnifications. The microscope objective is labelled 4, the various lenses of the objective 4 being depicted in FIG. 3. In case of high magnification, an illuminated point on the object field 30 is effectively illuminated by a large area of the planar light source 20. By moving the diaphragm element 22 into the illumination light beam, contrast illumination can be achieved. Dark field illumination can be realized by further moving the diaphragm element 22 into the illumination light beam until a situation occurs where the illumination light beam paths are no longer within the observation aperture 40 (see FIG. 1).

It is noted that FIGS. 2 and 3 show a section through a one channel microscope. FIGS. 4A, 4B, 5A, and 5B show the situation of a two channel microscope, however, only one channel being illustrated for reasons of clarity.

Figure 4A:
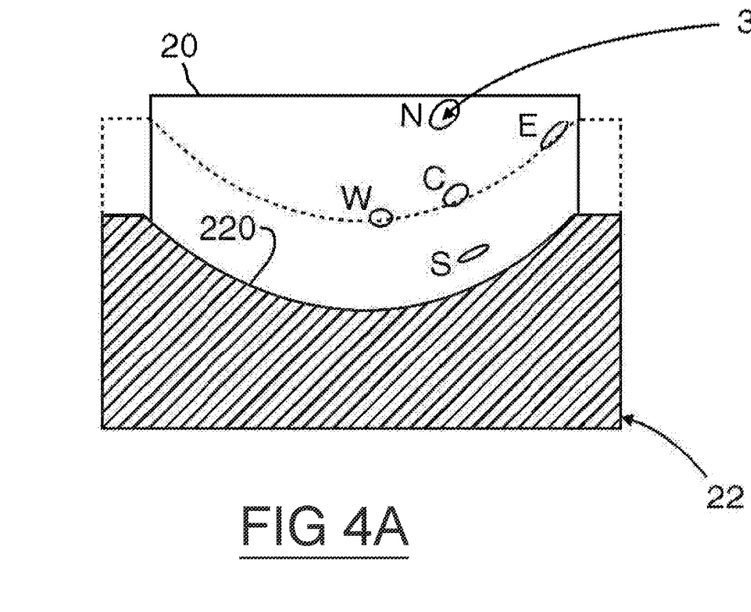
FIGS. 4A and 4B show an embodiment of a diaphragm element used in a transmitted light illumination apparatus according to the present invention, the illumination areas of different object field points being shown for a low microscope magnification (FIG. 4A) and for a high microscope magnification (FIG. 4B)
Figure 4B:
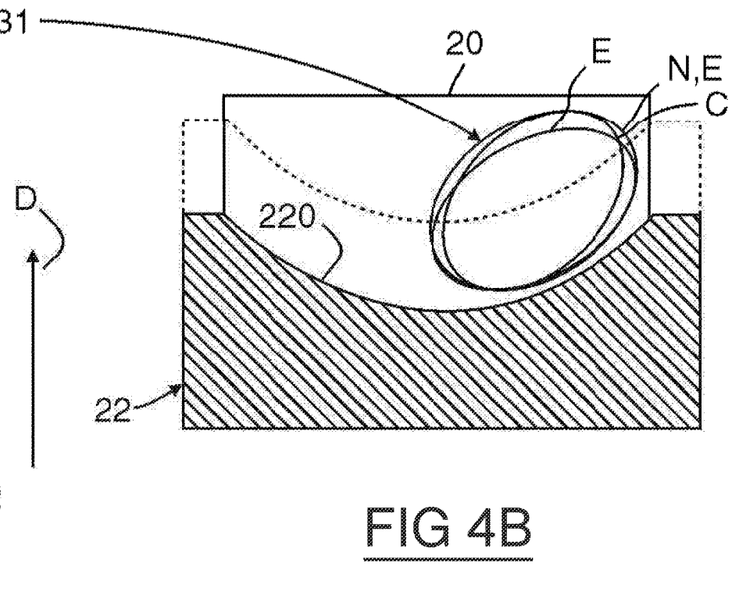

FIGS. 4A and 4B show positions and sizes of selected object field points in the plane of the planar light source 20, the corresponding illumination beams illuminating the selected object field points. The situation is depicted for an exemplary microscope configuration for a low magnification (FIG. 4A) and for a high magnification (FIG. 4B). The object field points 31 are labelled N for North, E for East, C for Center, W for West, S for South as perceived by an observer.

FIGS. 4A and 4B show a top view on an opaque diaphragm element 22 of a transmitted light base 2, the diaphragm element 22 partially shadowing the planar light source 20 located below. When applying a contrasting method to a stereomicroscope, attention is to be paid that the left and the right channels are uniformly contrasted. This can only be achieved with a North-South direction of contrasting corresponding to a movement of contrasting elements preferably in the North-South direction. In other words, care has to be taken that the contrasting conditions are essentially the same in the East-West direction for both observation channels of the stereomicroscope.

Applying a paraboloid mirror surface the light beams of different object field points are deflected in different ways for each observation channel and directed onto the plane of the light source 20. In the case of low magnification (FIG. 4A) the different object field points 31 (N depicts an object field point in the North part of the object field 30, E an object field point in the East part of the object field 30, etc., and C an object field point in the Center of the object field 30) impinge on the light source plane 20 separated from each other, e.g., N designates a circular area on the light source 20 which illuminates an object field point in the North of the object field 30. As can be seen from FIG. 4B, in the case of high magnification, the corresponding areas nearly entirely overlap. In order to realize a contrasting mode which is symmetrical in the East-West direction, the shadowing of the light beams, ideally of the pupil, should be symmetrical in the East-West direction. FIG. 4A shows a symmetric partial shadowing of the East, Center and West object field points 31. Such a symmetric (partial) shadowing can be achieved with a diaphragm element having an edge 220 of parabolic form (see broken line). By moving the diaphragm element 22 in the direction D up to the broken line shown in FIGS. 4A and 4B, such a symmetric shadowing can be achieved with the parabolic edge 220 of the diaphragm element 22. The situation for the second channel of the stereomicroscope can be obtained by mirroring at the axis of symmetry of the parabola.

Figure 5A:
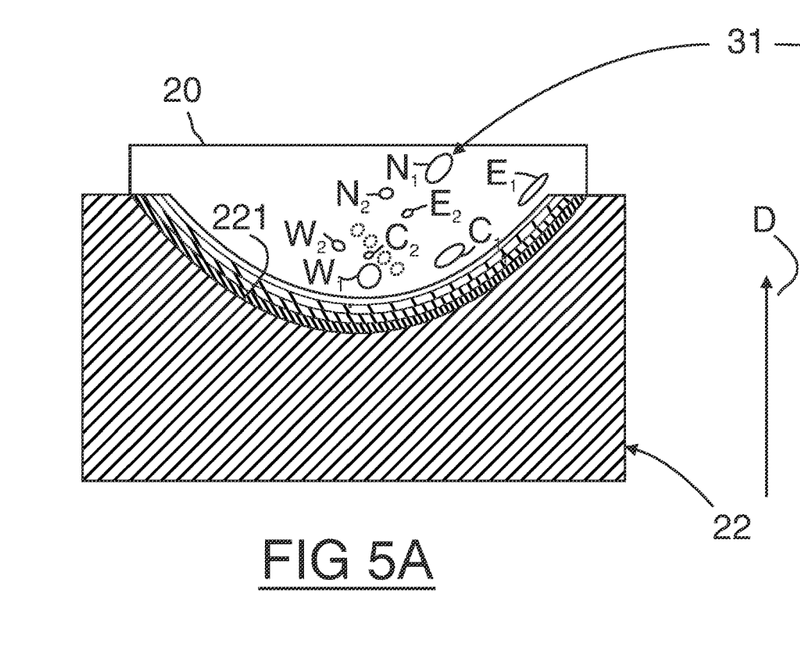
FIGS. 5A and 5B respectively show a same situation as FIGS. 4A and 4B for three different microscopic configurations.
Figure 5B:
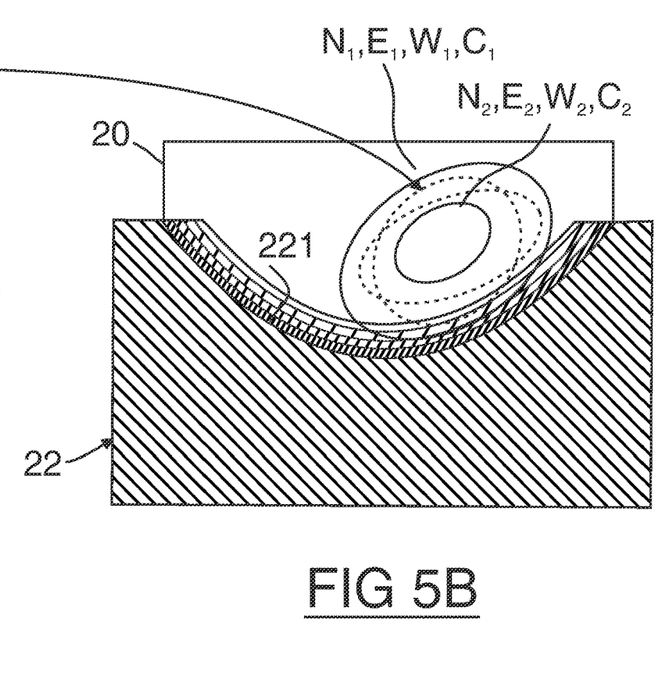

FIGS. 5A and 5B show the same situation as FIGS. 4A and 4B but for three different microscopic configurations. Each microscopic configuration represents a microscope set-up of e. g. different magnification and/or objective. North, East, West and Center object field points 31 of a first configuration are labelled $N_1$, $E_1$, $W_1$ and $C_1$, the corresponding points 31 of the second configuration are labelled $N_2$, $E_2$, $W_2$ and $C_2$. The corresponding points 31 of the third configuration are not labelled for clarity reasons. As one can see from FIG. 5A, the North object field points impinge on different locations of the light source plane 20 depending on the microscopic configuration; same is true for the West, East and Center points. Same is true in the case of high magnification shown in FIG. 5B. In order to be able to use the same transmitted light base 2 for the three different microscope configurations as shown in FIGS. 5A and 5B, an edge of the diaphragm element 22 can be used, which edge has a gradient 221 in its light transmissivity. Such a gradient represents a compromise taking into account the different microscope configurations. In the gradient, light transmissivity increases from 0% to 100%. The length of the gradient can be adjusted to shift the focus of performance e. g. from highly magnifying systems to low magnifying systems. Fine tuning of the parabolic form of the edge 220 and of the gradient 221 enables to take different relevant microscopic systems into account.

LIST OF REFERENCE SIGNS 1 microscope
2 transmitted light illumination apparatus
3 sample
4 objective lens
5 system
6 eyepiece
7 stand
20 planar light source
21 illumination aperture
22 diaphragm element
220 edge
221 gradient
23 mirror
24 concave mirror surface
30 object field
31 object field points
40 observation aperture
D direction of movement
S South
W West
C Center
N North
E East
P light emitting point
$P_S$ illuminated point (South)
$P_C$ illuminated point (Center)
$P_N$ illuminated point (North)

What is claimed is:

1. A transmitted light illumination apparatus (2) for a microscope (1), said transmitted light illumination apparatus (2) comprising:
   a planar light source (20),
   a mirror (23) having a concave mirror surface (24) arranged in the direction of light emitted from the planar light source (20), and
   at least one diaphragm element (22) being at least partially opaque and being arranged between the planar light source (20) and the concave mirror surface (24) such that by moving the at least one diaphragm element (22) in at least one direction parallel to a plane defined by the planar light source, the planar light source (20) is at least partially covered by the at least one diaphragm element (22), wherein the at least one diaphragm element (22) comprises an edge (220), said edge having a contour, wherein the edge (220) of the at least one diaphragm element (22) has a gradient (221) in its light transmissivity.

2. The transmitted light illumination apparatus (2) of claim 1, wherein the concave mirror surface (24) is of a paraboloid shape or a freeform surface.

3. The transmitted light illumination apparatus (2) of claim 1, wherein the planar light source (20) is arranged in a focus of the concave mirror surface (24).

4. The transmitted light illumination apparatus (2) of claim 1, wherein two diaphragm elements (22) are present, each of which is movable in relation to the other one along the same direction (D).

5. The transmitted light illumination apparatus (2) of claim 1, wherein the at least one diaphragm element (22) is a planar element.

6. The transmitted light illumination apparatus (2) of claim 1, wherein the edge (220) has an at least partially curved contour or an at least partially V-shaped contour.

7. The transmitted light illumination apparatus (2) of claim 6, wherein the at least partially curved contour is parabolic.

8. A microscope (1) having a transmitted light illumination apparatus (2) according to claim 1.

9. The microscope (1) of claim 8, wherein in a first position of the at least one diaphragm element (22) the planar light source (20) is not covered by the diaphragm element (22), and wherein by moving the diaphragm element (22) into a second position, the planar light source (20) is at least partially covered by the diaphragm element (22).

10. The microscope (1) of claim 8, wherein an object plane of the microscope (1) is arranged in the direction of light reflected from the mirror (23).

11. The microscope (1) of claim 8, wherein the at least one diaphragm element (22) comprises an edge (220), said edge having a contour, wherein the contour of the at least one diaphragm element (22) is variable in its shape.

12. The microscope (1) of claim 8, wherein the microscope is a stereomicroscope.

13. The microscope (1) of claim 8, wherein the microscope is a macroscope.

14. A microscope (1) having a transmitted light illumination apparatus (2), the transmitted light illumination apparatus (2) comprising:

a planar light source (20), a mirror (23) having a concave mirror surface (24) arranged in the direction of light emitted from the planar light source (20), and at least one diaphragm element (22) being at least partially opaque and being arranged between the planar light source (20) and the concave mirror surface (24) such that by moving the at least one diaphragm element (22) in at least one direction parallel to a plane defined by the planar light source, the planar light source (20) is at least partially covered by the at least one diaphragm element (22), wherein the at least one diaphragm element (22) comprises an edge (220), said edge having a contour, wherein the edge (220) of the at least one diaphragm element (22) has a gradient (221) in its light transmissivity, wherein a length of the gradient (221) is variable.

15. The microscope (1) of claim 14, wherein the microscope is a stereomicroscope.

16. The microscope (1) of claim 14, wherein the microscope is a macroscope.

\* \* \* \* \*